United States Patent [19]

Snell

[11] 4,183,454
[45] Jan. 15, 1980

[54] WELDING BACKUP EMPLOYING A TRAIN OF KNUCKLE-JOINT TILES

[75] Inventor: John B. Snell, Lake Elmo, Minn.

[73] Assignee: Minnesota Mining and Manufacturing Company, St. Paul, Minn.

[21] Appl. No.: 905,153

[22] Filed: May 12, 1978

[51] Int. Cl.² .............................................. B23K 9/02
[52] U.S. Cl. ...................................... 228/50; 52/593; 428/53; 428/60
[58] Field of Search ................... 228/50, 216; 52/593, 52/604, 609, 602; 404/41; 428/53–56, 58, 60, 61; 238/10 R, 10 B, 10 E, 10 F

[56] References Cited

U.S. PATENT DOCUMENTS

| 229,766 | 7/1880 | Smith | 52/593 |
|---|---|---|---|
| 722,580 | 3/1903 | Hill | 52/609 X |
| 1,365,162 | 1/1921 | Ferguson | 52/591 |
| 1,705,338 | 3/1929 | Playford | 52/602 X |
| 1,984,393 | 12/1934 | Brown | 52/284 |
| 2,155,026 | 4/1939 | Tracy | 122/156 |
| 3,221,614 | 12/1965 | Pertien | 52/604 X |
| 3,372,852 | 3/1968 | Cornell | 228/50 |
| 3,437,251 | 4/1969 | Wilkes | 228/50 |
| 3,460,736 | 8/1969 | Cadle et al. | 228/50 |
| 4,073,318 | 2/1978 | Close et al. | 138/149 |

FOREIGN PATENT DOCUMENTS

| 573559 | 4/1959 | Canada | 228/50 |
|---|---|---|---|
| 79211 | 1/1971 | Fed. Rep. of Germany | 228/50 |
| 1019255 | 1/1953 | France | 404/41 |
| 2275273 | 1/1976 | France | 228/50 |
| 27694 | 9/1970 | Japan | 228/216 |

Primary Examiner—Francis S. Nusar
Assistant Examiner—K. J. Ramsey
Attorney, Agent, or Firm—Cruzan Alexander; Donald M. Sell; Robert E. Granrud

[57] ABSTRACT

Welding backup having a train of rigid, heat-resistant tiles, the contiguous ends of which have round surfaces which provide knuckle joints. The round surfaces terminate in matching stops which limit the knuckle motion in either direction to 5–20 degrees.

17 Claims, 8 Drawing Figures

WELDING BACKUP EMPLOYING A TRAIN OF KNUCKLE-JOINT TILES

FIELD OF THE INVENTION

This invention concerns welding backup comprising a train of contiguous, rigid, heat-resistant tiles.

BACKGROUND TO THE INVENTION

A welding backup is sometimes used in the butt welding of metal plates to permit welding across the full thickness of the plates in one pass. The welding backup of U.S. Pat. No. 3,372,852 (Cornell) has an elongated, flexible, heat-resistant backing carrying an adhesive coating and a central longitudinal strip of flexible refractory material. Other welding backups employ a train of contiguous ceramic tiles instead of the flexible refractory material. As currently marketed by B. A. Kuder Company and at least two other companies, the ceramic tiles of the backup have a longitudinal groove similar to that of the refractory strip 4 of FIG. 3 of U.S. Pat. No. 3,372,852 in order to increase the thickness of the welded seam.

The Kuder backup is effective for providing flat welded seams. However, if used to make a convex welded seam, the flat ends of the adjacent tiles would separate at the central groove to permit some of the molten welding material to escape. Even if the tiles were not grooved, molten metal would escape through the V-shaped openings between the tiles after it had melted the broad faces of the tiles.

The Kuder backup is generally not used to make a concave welded seam, because the molten metal would flow out transversely through the V-shaped openings between the tiles.

OTHER PRIOR ART

The present invention employs tiles having knuckle joints somewhat similar to those of the silo staves of U.S. Pat. No. 1,705,338 (Playford). Flat ceramic tiles having similar knuckle joints are employed in U.S. Pat. No. 4,073,318 (Close et al.) as abrasion-resistant linings for chutes for delivering abrasive materials such as ores. The tiles of U.S. Pat. No. 4,073,318 have also been used as abrasion-resistant linings for grinding mills.

THE PRESENT INVENTION

The invention concerns that is believed to be the first welding backup employing a train of rigid tiles which provides a good seal against molten metal in making curved welded seams.

Like the aforementioned Kuder backup, the welding backup of the present invention comprises an elongated, flexible, heat-resistant backing to which is adhered a train of uniform, contiguous, rigid, heat-resistant tiles. The tiles like those of Kuder, may be generally flat with a uniform central groove in the exposed face of each tile extending the length of the train. A generally flat tile of the present invention preferably has a width of 2–6 cm, a length of 0.6–3 cm and a thickness of 0.6–2 cm. A bar-shaped tile of the present invention preferably has a thickness of 0.6–2 cm. The tiles are always less than 10 cm in length and 3 cm in thickness.

Unlike the welding backup of Kuder, the tiles of the present invention are interlocking. Each contiguous pair of the tiles forms a knuckle or ball-and-socket joint having round mating surfaces, each mating pair on substantially a common center or axis through substantially the center of a tile. When the tiles are generally flat, the round mating surfaces preferably are cylindrical and on substantially a common axis which extends transversely to the train of tiles midway between their board faces and essentially parallel to the backing. When the tiles are bar-shaped, the round surfaces preferably are spherical, each mating pair on substantially a common center at the center of a tile. A bar-shaped tile may be of circular or polygonal cross-section. If polygonal, its longitudinally-extending edges should be rounded to be less susceptible to injury and less likely to cut the backing.

Whether cylindrical or spherical, the round surfaces of the knuckle joints have substantially equal radii approximating one-half the thickness of the tiles, but the radii may be as great as about two-thirds or as small as about one-third the tile thickness. Smaller or larger radii would reduce the effectiveness of the interlocking action and provide more direct paths for the molten metal to escape.

The round surfaces of the knuckle joints terminate in matching stops to limit the pivoting in either direction to 50–20 degrees beyond collinear alingment. Preferably the stops are located so that each tile can pivot about 8 to 15 degrees beyond collinear alignment with each adjacent tile before the stops contact each other.

Upon shaping the welding backup of the invention to make a convex welded seam, the stops of the knuckle joints tend to contact each other one at a time until the stops of the entire train are in contact. At this point, there is a sudden increase in resistance that warns the user that further bending might tear the backing.

At the terminus of each convex surface of the knuckle joints, the stop is provided by a thin shoulder; and at the terminus of each concave surface of the knuckle joints, the stop is provided by a thin ledge. The heights of the ledges and shoulders should be as small as possible while insuring an effective limit to pivoting. Preferably each shoulder is 1/20 to 1/6 the tile thickness and about ½ the height of each ledge. In any event, the shoulder height should be at least 0.2 mm. If a ceramic tile were designed to have a shoulder height of less than 0.2 mm, wear on the tool for pressing the tile would eventually result in a blunt, ineffective shoulder.

THE DRAWING

Detailed aspects of the invention will be better understood in conjunction with the drawing in which.

Figure 1:
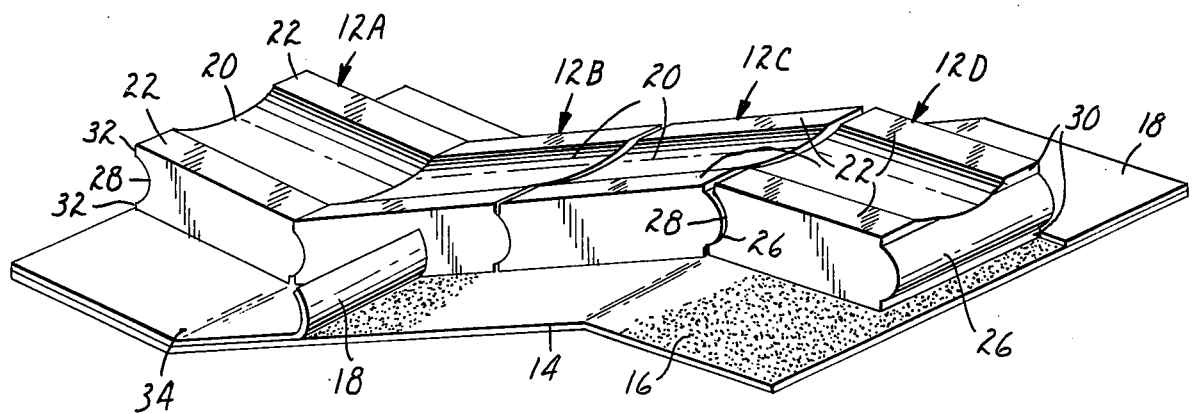
FIG. 1 is a schematic isometric view of a preferred welding backup of the invention.

Referring first to FIG. 1, a train of generally flat ceramic tiles 12A–12D is positioned in contiguous end-to-end relationship extending centrally the full length of a flexible, heat-resistant backing 14 which has a pressure-sensitive adhesive coating 16 that adheres the tile to the backing. A pair of disposable, low-adhesion webs 18 protect the adhesive coating 16 from contamination where it is not covered by the tiles. The broad faces (not shown) of the tiles which contact the adhesive coating 16 are essentially flat and rectilinear. The exposed broad face of each tile has a uniform central longitudinal groove 20 and flat lands 22 at the sides of the groove. The groove 20 is arcuate in transverse cross-section, and the tile thickness at the center of the groove exceeds one-half its thickness at the lands.

A convex cylindrical surface 26 is at one end of each tile, and a concave cylindrical surface 28 of the same radius is at the other end of the tile. Each cylindrical surface approximates a semi-cylinder and terminates at a stop provided by a shoulder 30 at each end of the convex surface 26 and a ledge 32 at each end of the concave surface 28. The adjacent shoulders 30 and ledges 32 are set back to limit the knuckle motion in either direction to about 12 degrees beyond collinear alignment. The cylindrical surfaces 26 and 28 comprising each knuckle joint have a common axis that extends transversely to the train of the tiles midway between their broad faces.

In FIG. 1, the left-hand tile 12A has been pivoted and 12 degrees beyond collinear alignment with respect to the adjacent time 12B until its shoulder 30 has contacted a ledge 32 of the tile 12B, thus limiting the ability of the illustrated welding backup to fit a convex surface. Further pivoting of the tile 12A with respect to tile 12B would create an opening between their mating cylindrical surfaces.

The flexible backing 14 should be rather extensible without breaking, because the pivoting of the tile 12A to the position shown in FIG. 1 with respect to the tile 12B produces considerable localized stretching at 34. However, the localized stretching is distributed over the normal area between the shoulder of the tile 12A and the ledge of the tile 12B, so that the backing is less likely to break than it would be if the ends of the tiles were flat. Dead-soft aluminum foil and moderately stretchable woven glass fabric are particularly useful in this respect. The longitudinal edges 37 of the tiles are blunt (as seen in FIG. 2), thus further minimizing the risk of rupturing the backing.

As can be seen in FIG. 1, the knuckle joints between tiles 12A and 12B and between tiles 12B and 12C are substantially tight, whereas a notch has opened between tiles 12C and 12D by pivoting the latter to fit a concave surface. This notch, which would allow molten metal to excape, can be closed by pushing the pivoted line 12D against tile 12C. A soft aluminum foil backing would readily buckle and hold the tiles against each other.

Although contiguous tiles readily separate as have tiles 12C and 12D, the train is interlocking in the sense that the knuckle joints tend to keep the broad faces of the tiles in alignment. The tiles of the aforementioned Kuder backup are not interlocking and can easily shift out of alignment to permit molten welding materials to escape.

Figure 2:
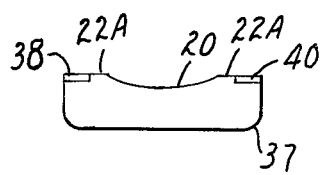
FIG. 2 is a lateral cross-section through a welding backup which differs from that of FIG. 1 in a minor detail.

To better hold the tiles together, the tiles could be formed to have a lateral cross-section as illustrated in FIG. 2 wherein lands 22A are notched to receive narrow extensible adhesive tapes 38 and 40 which may be of the same construction as the backing 14. If the lands were not notched, the entire surface of each land 22 of the tiles of FIG. 1 could be covered by an adhesive tape if the tape were so selected that it would not deleteriously contaminate the weld.

Although the adhesive-coated backing 14 preferably extends well beyond the sides of the train of tiles as in FIG. 1 in order to adhere the backup to a curved seam to be welded, this is not always necessary. A train of tiles on a backing may be held in place by a metal channel, in which case the width of the backing should not exceed that of the tiles. If the tiles were inserted into the channel one at a time, the backing 14 could be eliminated since the channel would perform its function.

Figure 3:
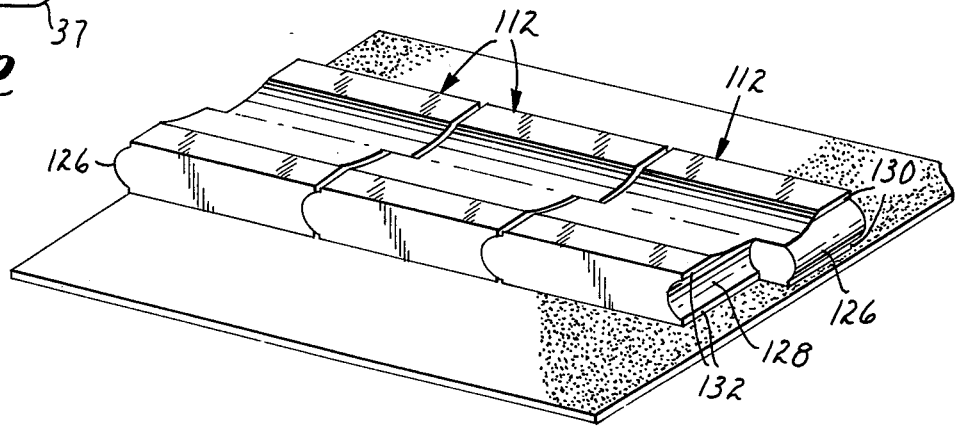
FIG. 3 is a schematic isometric view of a third welding backup of the invention.

In assembling tiles for application to the adhesive-coated backing 14 to produce the welding backups of FIGS. 1 and 2, all tiles must be oriented in the same direction. Generally flat tiles 112 of a welding backup as shown in FIG. 3 can be oriented in two directions. The tiles 112 are formed with knuckle joints comprising identical pairs of convex cylindrical surfaces 126 and concave cylindrical surfaces 128 at each end of the tile. Each cylindrical surface is essentially a semi-cylinder and extends from the center to a side of the tile. Each cylindrical surface 126 and 128 terminates in a pair of stops, namely, shoulders 130 terminating each convex cylindrical surface 126 and ledges 132 terminating each concave surface 128. Either end of each tile 112 would form a knuckle joint with either end of any other tiles.

Figure 4:
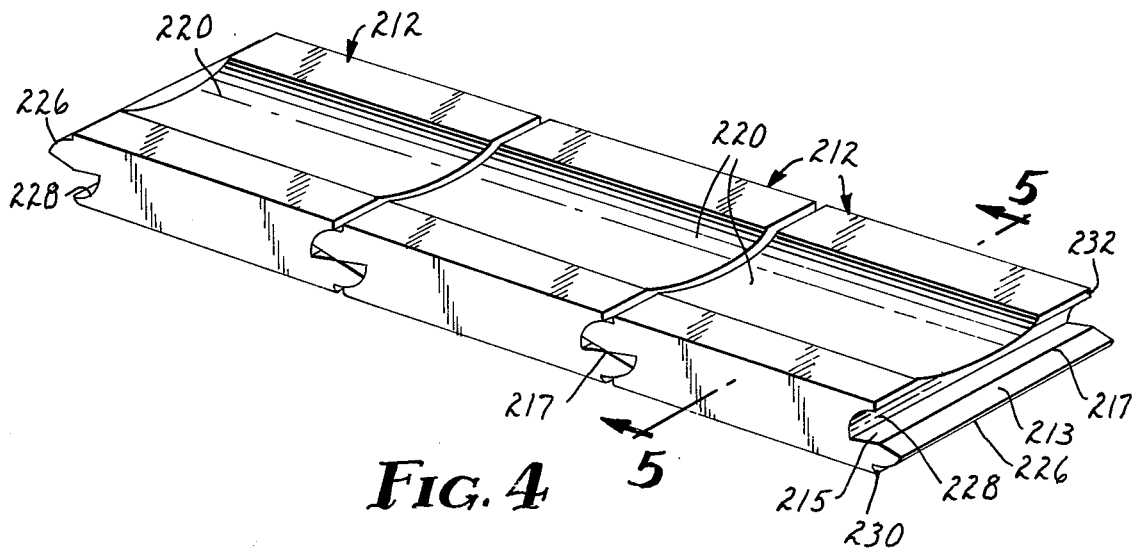
FIG. 4 is a schematic isometric view of a fourth welding backup of the invention.

In FIG. 4, each end of each generally flat tile 212 has one convex cylindrical surface 226 and one concave cylindrical surface 228, each approximating a quarter-cylinder. Connecting those cylindrical surfaces are a pair of generally longitudinal facets 213 and 215 of substantially equal area which intersect each other at an angle of 168° at a line 217. At the other end of each of the cylindrical surfaces 226 and 228 are a shoulder 230 and a ledge 232, respectively.

In each knuckle joint of FIG. 4, the tiles 212 pivot at the lines 217 up to about 12 degrees from collinear alignment. Further pivoting is inhibited both by the closing of the wedgeshaped openings between the facets and by each ledge 232 contacting a shoulder 230.

Figure 5:
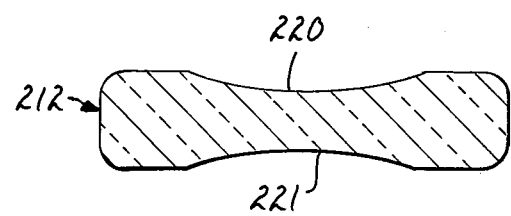
FIG. 5 is a cross-section along line 5—5 of FIG. 4.

As shown in FIG. 5, the tiles 212 have grooves 220 and 221 in both broad faces for ease of assembly, since either end of each tile 212 is matable with either end of any of the other tiles. If only one broad face were grooved, half of a random collection of the tiles 212 would otherwise need to be turned over for assembly into a welding backup.

Figure 6:
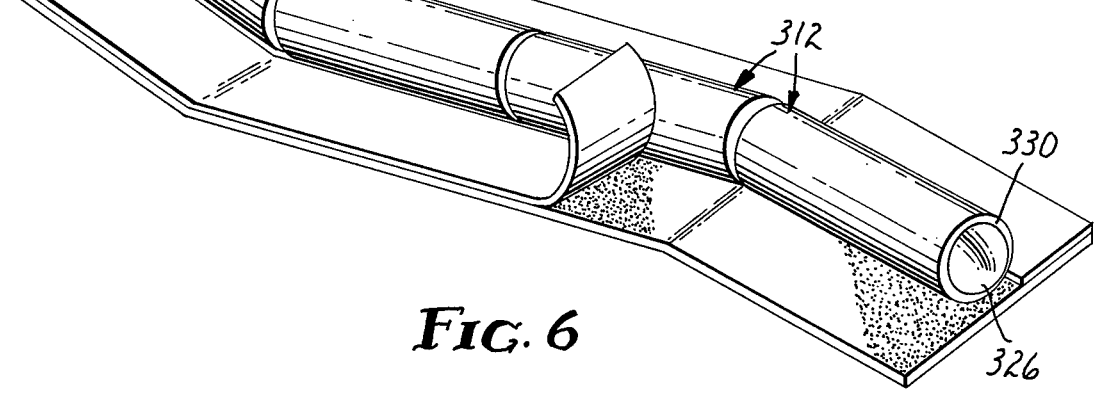
FIG. 6 is a schematic isometric view of a fifth welding backup of the invention, the tiles of which have a circular cross-section.

Each bar- or rod-shaped tile 312 shown in FIG. 6 has a convex spherical surface 326 and a concave spherical surface (not shown) which is matable with the convex surface of a like tile. The convex surface 326 terminates in an annular shoulder 330, and a concave surface terminates in an annular ledge (not shown). The welding backup of FIG. 6 is useful in the welding of tee joints, corner and double-vee joints.

Figure 7:
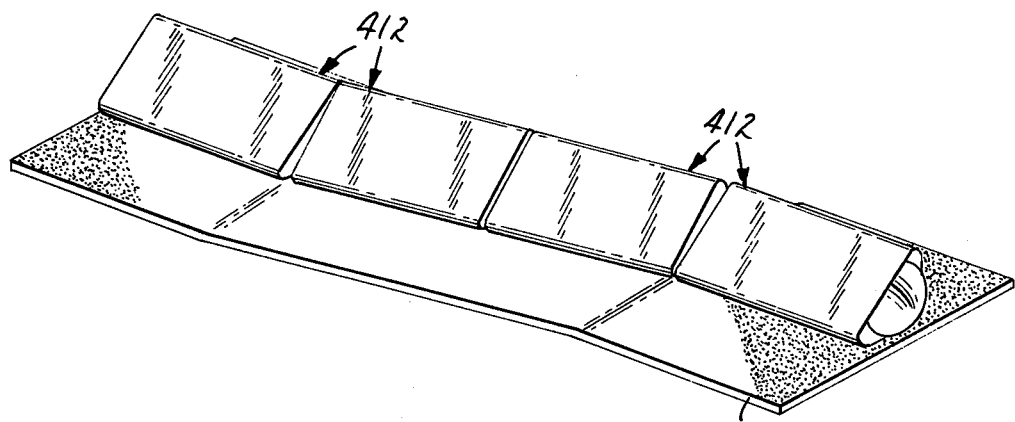
FIG. 7 is a schematic end view of a sixth welding backup of the invention, the tiles of which have a rounded triangular cross-section.
Figure 8:
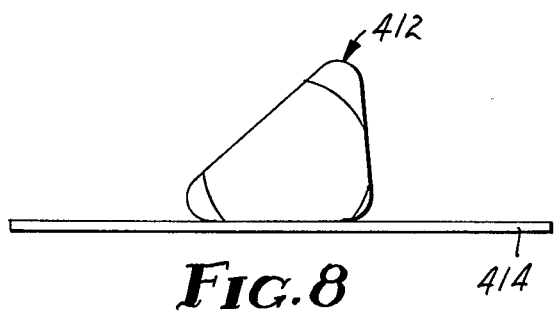
FIG. 8 is an end view of the concave end of a tile of the backup shown in FIG. 7.

Tiles 412 of FIGS. 7 and 8 are substantially triangular in cross-section, each angle being rounded to minimize breakage and to provide clearance for a welding bead. As best seen in FIG. 8, the three angles are 40°, 55° and 85°, and any of the opposing sides may be laid against a flexible backing 414. Larger angles would be provided by tiles of rounded quadrangular cross-section.

Other variations in the tile design will be obvious to the reader from the foregoing description of the drawings. For example, the split-knuckle joint design of FIG.

4 could be modified to provide four round surfaces at each end of each tile in the way the design of FIG. 1 is modified by FIG. 3.

EXAMPLE

The welding backup of FIG. 1 has been made using dead-soft aluminum foil 0.14 mm in thickness having the pressure-sensitive adhesive coating of Example 1 of U.S. Pat. No. 3,494,020 (Cornell) 0.05 mm in thickness. Ceramic tiles were formed to have a length and width of about 25 mm and a maximum thickness of about 6.3 mm. The groove in the exposed broad face had a radius of 13.5 mm and a width of 12.5 mm. The radius of each of the cylindrical knuckle-joint surfaces was 3.2 mm. The height of the shoulder was 0.23 mm and of the ledge was 0.58 mm. In collinear alignment, each shoulder at a convex surface was spaced from the corresponding ledge at a concave surface by 0.66 mm. Maximum pivoting was 12 degrees in either direction from collinear alignment before the shoulders and the ledges of adjacent tiles would contact each other.

I claimed:

1. In a welding backup comprising an elongated, flexible, heat-resistant backing to which is adhered a train of uniform, contiguous, rigid tiles less than 10 cm in length and 3 cm in thickness and capable of supporting molten metal, the improvement comprising:
   (a) the contiguous ends of the tiles have knuckle joints comprising round mating surfaces on substantially a common center or axis through substantially the center of a tile,
   (b) said round surfaces terminate in matching stops which limit the knuckle motion in either direction to 5 to 20 degrees beyond collinear alignment, and
   (c) the backing is extensible and will readily buckle so that the backup can be conformed to either convex or concave surfaces while keeping the knuckle joints substantially tight.

2. In a welding backup as defined in claim 1, the further improvement comprising:
   said stops are provided by a thin shoulder at a terminus of each of the round surfaces which is convex and by a thin ledge at a terminus of each of the round surfaces which is concave, the height of each shoulder being 1/30 to 1/6 the tile thickness and about ½ the height of each ledge.

3. In a welding backup as defined in claim 1, the further improvement comprising:
   the tiles are generally flat and the round surfaces of each knuckle joint are cylindrical, each mating pair on substantially a common axis which extends transversely to the train of tiles essentially parallel to the broad faces of the tiles.

4. In a welding backup as defined in claim 3, the further improvement comprising:
   there is a uniform central longitudinal groove in the exposed broad face of each tile and the longitudinal edges at the other broad face are blunt.

5. In a welding backup as defined in claim 4, the further improvement comprising:
   said groove is substantially arcuate in transverse cross section and is bordered by coplanar lands which occupy at least 20% of the exposed face of each tile.

6. In a welding backup as defined in claim 3, the further improvement comprising:
   each tile has only a convex cylindrical surface at one end and a concave cylindrical surface at the other end, each approximating a semi-cylinder.

7. In a welding backup as defined in claim 3, the further improvement comprising:
   each tile has at each end convex and concave cylindrical surfaces of equal width.

8. In a welding backup as defined in claim 7, the further improvement comprising:
   each cylindrical surface approximates a semi-cylinder and extends from the center to one side of the tile, either end of each tile being matable with either end of any of the other tiles.

9. In a welding backup as defined in claim 7, the further improvement comprising:
   each cylindrical surface approximates a quarter-cylinder, each convex surface is connected to a concave surface by a pair of facets which intersect each other at an angle of 182°–190° and the junctions of the facets of contiguous tiles are in contact with each other.

10. In a welding backup as defined in claim 9, the further improvement comprising:
    there is a uniform central longitudinal groove in each broad face of each tile so that either end of each tile can be mated with either end of any of the other tiles without interrupting the continuity of the longitudinal grooves in the exposed faces of the tiles.

11. In a welding backup as defined in claim 3, the further improvement comprising:
    each tile is a ceramic tile which is at least 4 mm and not more than 40 mm in each of the widthwise and lengthwise directions and its thickness is less than 10 mm and no more than one half either its width or length.

12. In a welding backup as defined in claim 1, the further improvement comprising:
    the tiles are bar-shaped and said round surfaces are spherical, each mating pair on substantially a common center.

13. In a welding backup as defined in claim 12, the further improvement comprising:
    the tiles are of circular cross-section.

14. In a welding backup as defined in claim 12, the further improvement comprising:
    the tiles are of triangular cross-section and their longitudinally-extending edges are rounded.

15. In a welding backup as defined in claim 14, the further improvement comprising:
    each angle of the triangle is substantially different from the other angles.

16. In a welding backup as defined in claim 1, the further improvement comprising:
    the stops are located to permit knuckle motion in either direction of at least 8 degrees but not more than 15 degrees beyond collinear alignment before the stops contact each other.

17. In a welding backup as defined in claim 1, the further improvement comprising:
    the radii of said round surfaces approximate one-half the thickness of the tiles.

* * * * *

UNITED STATES PATENT AND TRADEMARK OFFICE
CERTIFICATE OF CORRECTION

PATENT NO. : 4,183,454
DATED : January 15, 1980
INVENTOR(S) : JOHN B. SNELL

It is certified that error appears in the above—identified patent and that said Letters Patent are hereby corrected as shown below:

Column 2, line 4 "board" should read -- broad --; column 2, line 24 "50-20" should read -- 5-20 -- and "alingment" should read -- alignment --. Column 3, line 29 "and" should read -- about --; column 3, line 55 "excape" should read -- escape --.

Signed and Sealed this

Seventeenth Day of June 1980

[SEAL]

Attest:

SIDNEY A. DIAMOND

Attesting Officer

Commissioner of Patents and Trademarks